UNITED STATES PATENT OFFICE.

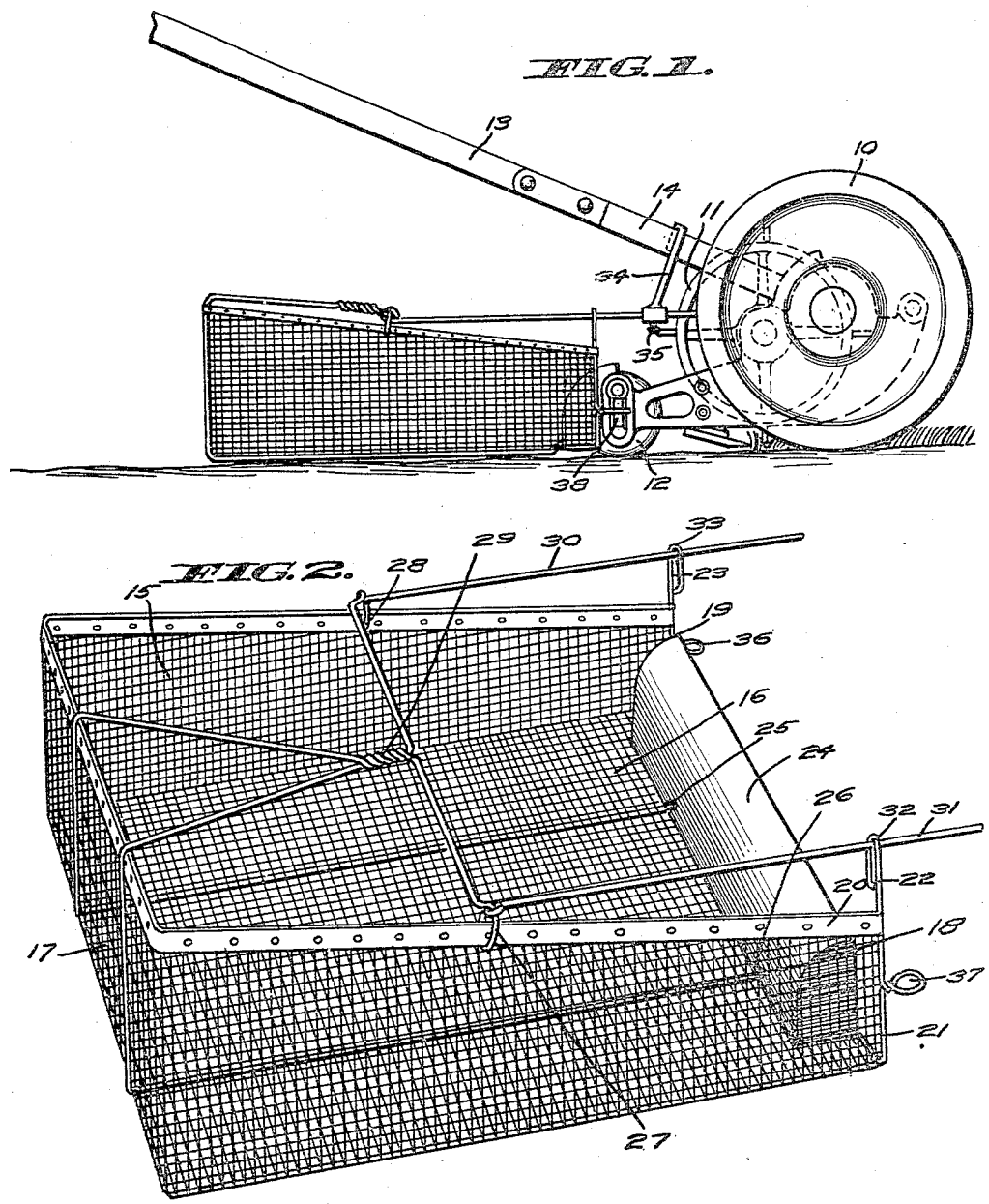

SAMUEL KOEHLI, OF PASADENA, CALIFORNIA.

BASKET FOR LAWN-MOWERS.

1,244,341.   Specification of Letters Patent.   Patented Oct. 23, 1917.

Application filed December 19, 1916. Serial No. 137,893.

*To all whom it may concern:*

Be it known that I, SAMUEL KOEHLI, a citizen of the United States, residing at Pasadena, in the county of Los Angeles and State of California, have invented new and useful Improvements in Baskets for Lawn-Mowers, of which the following is a specification.

This invention relates to a grass catcher and particularly pertains to a demountable catcher adapted for use upon lawn mowers.

It is the principal object of this invention to provide a light-weight portable grass catcher which may be readily attached to a lawn mower and may be easily removed therefrom and carried to any desired location.

Another object of this invention is to provide a grass catcher which, when mounted upon a lawn mower, will prevent the grass from falling between the catcher and the roller as is commonly experienced.

Another object of this invention is to provide a grass catcher which may be mounted upon a lawn mower without permanent fastenings and which may be so adjusted as to be supported at any desired angle to the ground and the handle of the machine.

It is a further object of this invention to provide a grass catcher which is simple in its construction and is so formed as to be strong and durable.

Other objects will appear hereinafter.

The invention is illustrated, by way of example, in the accompanying drawings in which:

Figure 1 is a view in side elevation illustrating a lawn mower as supplied with the grass catcher.

Fig. 2 is a view in perspective disclosing the grass catcher as disassociated from the lawn mower and showing it on an enlarged scale.

The catcher is adapted to be mounted upon most lawn mowers in present use and is here shown as mounted upon a lawn mower having traction wheels 10, a cutter 11, and a rear roller 12, all of common construction. The machine is provided with a handle 13 secured to the lawn mower by a handle fork 14 by which the structure is propelled. Mounted in the rear of the roller 12 is a basket 15 with which the present invention is concerned. This basket is formed with a bottom 16, a rear end wall 17, and a pair of sloping side walls 18 and 19, all formed of a reticulated material. The upper marginal edges of the basket are preferably bound by means of a suitable binding strip 20 which will act to maintain the material in its intended shape. As a means for further forming the basket and strengthening it, an end stay 21 is provided. This stay is formed with upwardly extending frame rods 22 and 23 which are positioned vertically and along the forward edges of the side walls 18 and 19. The main body portion of this stay extends across the front of the basket and along the bottom thereof and is formed in off-set manner in order to accommodate the roller 12. This roller is covered by means of a sheet metal shield 24 which is arcuate in shape and partially encompasses the roller to prevent the loss of grass between the roller and the basket. Longitudinally extending reinforcing stays 25 and 26 are attached at their forward ends to the body portion of the stay 21 and extend parallel and in spaced relation to each other beneath the bottom of the basket to the rear end thereof where they are turned upwardly and thereafter brought over to a point of convergence above the basket. Here they are twisted upon themselves and bent to extend diametrically opposite from each other to engage the sides of the basket by means of loops 27 and 28. The portion of the stays which has been twisted forms a handle 29 by which the basket may be carried. Linked into the loops 27 and 28 are two supporting or draw rods 30 and 31 which extend forwardly and pass through oblong loops 32 and 33 formed upon the upper ends of the frame rods 22 and 23. The rods 30 and 31 provide a mounting for bracket hooks 34 which extend upwardly and pass over the forked arms of the handle. Set screws 35 are mounted in the bearing portion of the brackets and permit them to be longitudinally adjusted upon the rods so that the basket may be supported at various angles. As a means for further supporting the basket and insuring that it will follow the lawn mower, a pair of horizontally disposed loops 36 and 37 are formed along the length of the vertically extending frame uprights 22 and 23 and are adapted to be placed in an encompassing position over vertical studs 38 with which most lawn mowers are provided.

In using the grass catcher, the bracket hooks 34 are suitably adjusted upon the rods 30 and 31 to maintain the basket at a given angle, as it is supported by the hooks while in engagement with the handle forks. It will thus be seen that the basket is so supported by the handle as to permit a wide range of handle movement without materially raising the basket. The basket is then positioned with the loops 36 and 37 over the studs 38 and will thereafter move with the lawn mower and rise as the handle is raised. When the basket is full of grass it may be removed by grasping the handle 29 and lifting it upwardly so that the hooks 34 will disengage the handle forks and the loops 36 and 37 will pass over the studs 38, thus permitting the basket to be carried from place to place.

It will thus be seen that the basket here provided is simple and inexpensive in construction and possesses great strength and durability and may be conveniently mounted upon and removed from most lawn mowers in common use.

While I have shown the preferred construction of my grass catcher for lawn mowers as now known to me, it will be understood that various changes in the combination, construction, and arrangement of parts may be made by those skilled in the art without departing from the spirit of my invention.

I claim:

1. A grass catcher for lawn mowers, comprising a basket formed of reticulated material having an opened top and an opened end, a supporting frame binding the marginal edges of the basket walls, a recess formed along the forward edge of the basket floor, an arcuate shield member secured along said recess and adapted to partially encompass the roller of a lawn mower, a pair of engaging eyes secured to said frame along the forward edges of the basket side walls in a manner whereby they may detachably engage studs positioned upon the frame of the lawn mower, a pair of reinforcing stays which extend beneath the floor of the basket and are led up over the basket, said stay members being brought forwardly over the top of the basket to form a handle by which it may be lifted, and adjustable means whereby the basket may be detachably supported by the fork of the lawn mower handle.

2. A grass catcher for lawn mowers, comprising a basket having a floor, a vertically extending rear wall, and parallel side walls, said floor being formed with a rectangular cut-away portion along the opened end of the basket in order to accommodate a lawn mower roller, an arcuate inclosure fixed over said recess and adapted to partially encompass the roller, a wire frame member binding the forward edges of the side walls and the marginal edge of the floor, a series of horizontally disposed loops formed by said frame member along the edge of the side walls, said loops being adapted to be engaged by lugs upon the frame of the lawn mower, a pair of reinforcing stays secured to said frame member and adapted to support the floor of the basket, after which they are brought over the basket top and secured to the side walls thereof, a handle formed by said stays, a pair of supporting rods extending from said stays and supported at their forward ends by the frame, and adjustable brackets mounted upon said extensions whereby the fork of the lawn mower may be engaged in a manner to partially support the basket.

3. A grass catcher for lawn mowers comprising a bottom, a rear end wall, and side walls all formed integral of reticulated material, a binding secured to the upper edges of the end and side walls, a cross stay rod secured along the forward edges of the bottom and side walls and the forward ends of the binding and extending upwardly from the binding; the front part of the bottom being notched out and the cross stay being off-set to form a place for the roller of a lawn mower; an arcuate sheet metal shield extending upwardly from the off-set portion of the cross stay to partially cover said lawn mower roller, longitudinal stays attached to the cross stay at the bottom of the shield and extending backwardly along the bottom and upwardly along the rear end wall and then forwardly and brought together and secured to each other above the center of the bottom, and then extending laterally and secured to the binding by loops, and draw rods connected to said loops and extending forwardly and secured to the upper ends of the cross stay and extending beyond the cross stay.

4. A grass catcher for lawn mowers comprising a bottom, a rear end wall, and side walls all formed integral of reticulated material, a binding secured to the upper edges of the end and side walls, a cross stay rod secured along the forward edges of the bottom and side walls and the forward ends of the binding and extending upwardly from the binding; the front part of the bottom being notched out and the cross stay being off-set to form a place for the roller of a lawn mower; an arcuate sheet metal shield extending upwardly from the off-set portion of the cross stay to partially cover said lawn mower roller, longitudinal stays attached to the cross stay at the bottom of the shield and extending backwardly along the bottom and upwardly along the rear end wall and then forwardly and brought together and secured to each other above the center of the bottom, and then extending laterally and secured to the binding by loops, draw rods connected to said loops and extending forwardly and secured to the upper ends of the cross stay and extending beyond the cross stay, and bracket hooks adjustably mounted upon the draw rods in front of the cross stay.

5. A grass catcher for lawn mowers comprising a bottom, a rear end wall, and side walls all formed integral of reticulated material, a binding secured to the upper edges of the end and side walls, a cross stay rod secured along the forward edges of the bottom and side walls and the forward ends of the binding and extending upwardly from the binding; the front part of the bottom being notched out and the cross stay being off-set to form a place for the roller of a lawn mower; an arcuate sheet metal shield extending upwardly from the off-set portion of the cross stay to partially cover said lawn mower roller, longitudinal stays attached to the cross stay at the bottom of the shield and extending backwardly along the bottom and upwardly along the rear end wall and then forwardly and brought together and secured to each other above the center of the bottom, and then extending laterally and secured to the binding by loops, draw rods connected to said loops and extending forwardly and secured to the upper ends of the cross stay and extending beyond the cross stay, bracket hooks adjustably mounted upon the draw rods in front of the cross stay, and loops extending forward from the cross stay at the front ends of the side walls.

In testimony whereof I have signed my name to this specification.

SAMUEL KOEHLI.

Copies of this patent may be obtained for five cents each, by addressing the "Commissioner of Patents, Washington, D. C."